US006963385B2

(12) United States Patent
Aruga et al.

(10) Patent No.: US 6,963,385 B2
(45) Date of Patent: Nov. 8, 2005

(54) ELECTROOPTIC DEVICE, DRIVING IC, AND ELECTRONIC APPARATUS

(75) Inventors: Yasuhito Aruga, Matsumoro (JP); Ryosuke Imaseki, Nagano-ken (JP)

(73) Assignee: Seiko Epson Corporation (JP)

( * ) Notice: Subject to any disclaimer, the term of this patent is extended or adjusted under 35 U.S.C. 154(b) by 187 days.

(21) Appl. No.: 10/141,505

(22) Filed: May 8, 2002

(65) Prior Publication Data

US 2002/0167623 A1 Nov. 14, 2002

(30) Foreign Application Priority Data

May 9, 2001 (JP) .......................... 2001-138817
Mar. 25, 2002 (JP) .......................... 2002-084193

(51) Int. Cl.[7] .................. G02F 1/1345; G09G 3/36; G09G 5/00; H01L 21/00; H01L 23/48
(52) U.S. Cl. .................. 349/151; 349/150; 349/152; 345/98; 345/103; 345/104; 345/204; 438/30; 257/890
(58) Field of Search ............... 349/149, 150, 349/151, 152; 345/98, 103, 104, 204; 438/30; 257/690

(56) References Cited

U.S. PATENT DOCUMENTS

| 5,825,081 | A | * | 10/1998 | Hosomi et al. | ............. | 257/668 |
| 6,323,930 | B1 | | 11/2001 | Higuchi et al. | | |
| 6,603,071 | B2 | * | 8/2003 | Takao | ............. | 174/52.1 |
| 6,707,440 | B2 | * | 3/2004 | Aoki | ............. | 345/87 |
| 2001/0015709 | A1 | * | 8/2001 | Imajo et al. | ............. | 345/87 |

FOREIGN PATENT DOCUMENTS

| JP | 09-68715 | 3/1997 |
| JP | 10-319419 | 12/1998 |
| JP | 2000-340613 | 12/2000 |
| JP | 2001-094053 | 4/2001 |
| JP | 2002-217237 | 8/2002 |
| WO | WO 98/12597 | 3/1998 |

OTHER PUBLICATIONS

Communication from Japanese Patent Office re: counterpart application.

* cited by examiner

Primary Examiner—Tarifur R. Chowdhury
Assistant Examiner—Hoan Chau Nguyen
(74) Attorney, Agent, or Firm—Harness, Dickey & Pierce, P.L.C.

(57) ABSTRACT

A liquid crystal device comprises a pair of substrates 2a and 2b, liquid crystal L held between the substrates 2a and 2b, and an IC 13 mounted on an overhang section 2c of the substrate 2a. A terminal column 26a comprises a plurality of terminals 18 aligned in a direction away from the liquid crystal L. The terminal column 26a has, in the order of the closeness to the liquid crystal L, a first noneffective terminal region within a distance "A" from a first side of the IC, an effective terminal region X continuing from the first noneffective terminal region, and a second noneffective terminal region within a distance "B" from a second side of the IC, the second noneffective terminal region continuing from the effective terminal region. The distances A and B are adjusted to satisfy the relationship A>B.

9 Claims, 14 Drawing Sheets

ELECTROOPTIC DEVICE, DRIVING IC, AND ELECTRONIC APPARATUS

BACKGROUND OF THE INVENTION

1. Technical Field of the Invention

The present invention relates to an electrooptic device such as a liquid crystal device and an electroluminescence (EL) device, a driving IC suitable for use in the electrooptic device, and an electronic apparatus comprising the electrooptical device.

2. Description of the Related Art

Recently, electrooptic devices such as liquid crystal devices and EL devices are widely used in electronic apparatuses such as cellular phones, portable information terminals, and personal computers. The electrooptic devices are, for example, used in display units for displaying various information about the electronic apparatuses.

Generally, the electrooptic devices such as liquid crystal devices and EL devices have a panel structure in which an electrooptic material such as liquid crystal or EL is two-dimensionally arranged on a substrate. In a panel structure of a chip-on-glass (COG) mounting type, a driving IC is directly mounted on a substrate supporting an electrooptic material. The COG-type panel structure is made by bonding active faces of the driving IC to the substrate through a conductive bonding element such as anisotropic conductive film (ACF).

The above conventional electrooptic devices often suffer from display failure when an external force is applied to the electrooptic device by dropping, for example. The inventors have conducted various experiments to find the cause of the display failure. As a result, the inventors have found that the cause of the display failure is the disconnection between the terminal of the driving IC, i.e., a bump, and the terminal on the substrate caused by local detachment of the driving IC bonded onto the substrate using ACF or the like due to the application of the external force.

To describe in detail, first, a liquid crystal device having the structure shown in FIG. 7 was prepared. This liquid crystal device was made by bonding a small glass 51 and a large glass 52 with a sealing material 53, filling the interior with liquid crystal through a liquid crystal inlet 53a provided at a portion of the sealing material 53, and mounting a driving IC 56 on an overhang section 52a of the large glass 52 with an ACF 54. Two types of the driving IC 56, i.e., one having a planar dimension A×B=9.6 mm×1.8 mm and the other having a planar dimension A×B=13.93 mm×2.1 mm were prepared so as to make two liquid crystal devices of different type.

In these two liquid crystal devices, while supporting the large glass 52, a force F of 15 Newton (N) is applied to the face of the small glass 51 having a width of 0.5 mm from an edge of the small glass 51 so that the edge of the small glass 51 is moved in the force application direction by 0.2 mm. At this time, stresses generated at each position in the region from a corner P0 at the small glass 51 side to an opposing corner P1 relative to a shorter side and stresses generated at each position in the region from the corner P0 to an opposing corner P2 relative to a longer side were measured.

The results of the measurement are shown as a graph in FIG. 8. The graph demonstrates the following:

(1) A significantly high stress is generated at the corner P0 located at the small glass 51 side of the driving IC 56 and at the vicinity thereof, readily causing the detachment of the driving IC 56;

(2) At a position 0.2 mm distant from the corner P0, the stress is sufficiently low so as not to cause problems during use; and (3) In the vicinity of the opposing corner P1 relative to the short side, the stress increases again but not as high as that at the corner P0 at the small glass 51 side.

The present invention is made based on the above-described findings. An object of the present invention is to prevent display failure of the electrooptic device even when an external force caused by, for example, dropping, is applied to the electrooptic device such as a liquid crystal device, by improving the terminal structure, i.e., the bump structure, of IC chips such as driving IC chips.

SUMMARY OF THE INVENTION (1) In order to achieve the above object, the present invention provides an electrooptic device comprising an electrooptic material, a substrate for supporting the electrooptic material, and an IC chip mounted on the substrate. The IC chip comprises a terminal column comprising a plurality of terminals arranged in a direction away from the electrooptic material. The terminal column comprises a first noneffective terminal region within a distance "A" from a first side of the IC chip located closest to the electrooptic material, an effective terminal region continuing from the first noneffective terminal region, and a second noneffective terminal region within a distance "B" from a second side of the IC chip, the second noneffective terminal region continuing from the effective terminal region, the first noneffective terminal region, the effective terminal region, the second noneffective terminal region provided in that order when viewed from the electrooptic material. The distance A and B satisfy the relationship:

A>B.

For the purpose of the descriptions above and below, the term "electrooptic material" refers to a material which varies its optical characteristics by electrification. Examples of such a material include liquid crystal and electroluminescence. The term "noneffective terminal region" refers to a region which does not function as an effective terminal region. Examples of such a region include a region having no bumps and a region having bumps identical in shape to those formed in the effective terminal region but not carrying electric current, i.e., dummy bumps.

According to the structure of the electrooptic device above, the noneffective terminal region is formed at the region of the IC chip on which large stresses are applied due to an external force. Thus, display failure can be prevented even when local detachment of the IC occurs at such a region.

(2) Another aspect of the present invention provides an electrooptic device comprising an electrooptic material, a substrate for supporting the electrooptic material, and an IC chip mounted on the substrate, the IC chip comprising: a second terminal column close to the electrooptic material, the second terminal column comprising a plurality of terminals arranged in parallel to the electrooptic material; and a third terminal column remote from the electrooptic material, the third terminal column comprising a plurality of terminals arranged in parallel to the electrooptic material. The second terminal column comprises a third noneffective terminal region within a distance "C" from a side of the IC chip, and an effective terminal region continuing from the third noneffective terminal region. The third terminal column comprises a fourth noneffective terminal region within a distance "D" from the side of the IC chip and an effective terminal region continuing from the fourth noneffective terminal region. The distances C and D satisfy the relationship:

$$C>D.$$

According to the structure of the electrooptic device above, the noneffective terminal region is formed at the region of the IC chip on which large stresses are applied due to an external force. Thus, display failure can be prevented even when local detachment of the IC occurs at such a region.

(3) Another aspect of the present invention provides an electrooptic device comprising an electrooptic material, a substrate for supporting the electrooptic material, and an IC chip mounted on the substrate, the IC chip comprising: a first terminal column comprising a plurality of terminals arranged in a direction away from the electrooptic material; and a second terminal column disposed along a first side of the IC chip close to the electrooptic material, the second terminal column comprising a plurality of terminals arranged in parallel to the electrooptic material. The first terminal column comprises a first noneffective terminal region within a distance "A" from the first side of the IC chip, and an effective terminal region continuing from the first noneffective terminal region. The second terminal column comprises a third noneffective terminal region within a distance "C" from a side of the IC chip and an effective terminal region continuing from the third noneffective terminal region. The distances A and C satisfy the relationship:

$$A>C.$$

According to the structure of the electrooptic device above, the noneffective terminal region is formed at the region of the IC chip on which large stresses are applied due to an external force. Thus, display failure can be prevented even when local detachment of the IC occurs at such a region.

(4) Another aspect of the present invention provides an electrooptic device comprising an electrooptic material, a substrate for supporting the electrooptic material, and an IC chip mounted on the substrate, the IC chip comprising: a first terminal column comprising a plurality of terminals arranged in a direction away from the electrooptic material; a second terminal column disposed close to the electrooptic material, the second terminal column comprising a plurality of terminals arranged in parallel to the electrooptic material; and a third terminal column disposed remote from the electrooptic material, the third terminal column comprising a plurality of terminals arranged in parallel to the electrooptic material. The distance "G" between a first corner of the IC chip and the corresponding intersection of the first terminal column and the second terminal column, and the distance "H" between a second corner of the IC chip and the corresponding intersection of the first terminal column and the third terminal column satisfy the relationship:

$$G>H.$$

According to the structure of the electrooptic device above, the noneffective terminal region is formed at the region of the IC chip on which large stresses are applied due to an external force. Thus, display failure can be prevented even when local detachment of the IC occurs at such a region.

(5) Another aspect of the present invention provides an electrooptic device comprising an electrooptic material, a substrate for supporting the electrooptic material, and an IC chip mounted on the substrate, the IC chip comprising: a second terminal column disposed along a first side of the IC chip close to the electrooptic material, the second terminal column comprising a plurality of terminals arranged in parallel to the electrooptical material; and a third terminal column disposed along a second side of the IC chip remote from the electrooptic material, the third terminal column comprising a plurality of terminals arranged in parallel to the electrooptical material. The distance "a" between the second terminal column and the first side of the IC chip, and the distance "b" between the third terminal column and the second side of the IC chip satisfy the relationship:

$$a>b.$$

According to the structure of the electrooptic device above, the noneffective terminal region is formed at the region of the IC chip on which large stresses are applied due to an external force. Thus, display failure can be prevented even when local detachment of the IC occurs at such a region.

(6) Another aspect of the present invention provides an electrooptic device comprising an electrooptic material, a substrate for supporting the electrooptic material, and an IC chip mounted on the substrate, the IC chip comprising a terminal column comprising a plurality of terminals arranged in a direction away from the electrooptic material, the terminal column comprising a first noneffective terminal region within a distance "A" from a side of the IC chip closest to the electrooptic material, and an effective terminal region continuing from the first noneffective terminal region, the first noneffective terminal region and the effective terminal region being provided in that order when viewed from the electrooptic material. The distance A satisfies the relationship:

$$A>0.2\ mm.$$

According to the structure of the electrooptic device above, the noneffective terminal region is formed at the region of the IC chip on which large stresses are applied due to an external force. Thus, display failure can be prevented even when local detachment of the IC occurs at such a region.

(7) Another aspect of the present invention provides an electrooptic device comprising an electrooptic material, a substrate for supporting the electrooptic material, and an IC chip mounted on the substrate, the IC chip comprising a terminal column disposed along a side of the IC chip closest to the electrooptic material, the terminal column comprising a plurality of terminals arranged in parallel to the electrooptic material, the terminal column comprising a first noneffective terminal region within a distance "C" from a side of the IC chip, and an effective terminal region continuing from the first noneffective terminal region. The distance C satisfies the relationship:

$$C>0.2\ mm.$$

According to the structure of the electrooptic device above, the noneffective terminal region is formed at the region of the IC chip on which large stresses are applied due to an external force. Thus, display failure can be prevented even when local detachment of the IC occurs at such a region.

(8) In each of the electrooptic devices (1) to (7) above, the electrooptic material may be liquid crystal, and the IC chip may be mounted on at least one of a pair of substrates which hold the liquid crystal therebetween.

The electrooptic device having the above structure functions as a liquid crystal device in which voltages applied to the liquid crystal are controlled according to the pixels so as to modify the light transmitting through the liquid crystal according to the pixels and to form images such as alphabets, numbers, and diagrams on one side of the liquid crystal.

(9) In each of electrooptic devices (1) to (8) above, each noneffective terminal region may comprise a dummy terminal which has the same structure as that formed in the effective terminal region and does not contribute to carrying electric current.

If a region having no bumps is provided in a terminal or bump arrangement formed on the active face of the IC chip, bonding failure or connection failure may occur due to nonuniform arrangement of the bumps when the IC is mounted on the substrate using a conductive adhesive element such as ACF at the active face of the IC. By forming dummy bumps as in (9) above, the bump arrangement can be made uniform, and bonding failure and connection failure can thus be prevented.

Another aspect of the present invention provides a driving IC comprising a rectangular active face and a terminal column comprising a plurality of terminals arranged along a short side of the rectangular active face. The terminal column includes a first noneffective terminal region within a distance "A" from a first long side of the rectangular active face, an effective terminal region continuing from the first noneffective terminal region, and a second noneffective terminal region within a distance "B" from a second long side of the rectangular active face, the second noneffective terminal region continuing from the effective terminal region, the first noneffective terminal region, the effective terminal region, and the second noneffective terminal region being provided in that order when viewed from the first long side. The distances A and B satisfy the relationship:

$$A>B.$$

According to the driving IC described above, even when an external force is applied to a structure comprising this IC mounted on the substrate with a conductive adhesive element such as ACF by dropping or the like, the noneffective terminal region is formed on the region of the IC chip where large stresses are generated. Thus, even when the IC locally detaches at such a region, conduction failure between the IC chip and the substrate can be prevented.

(11) Another aspect of the present invention provides a driving IC comprising a rectangular active face, a second terminal column comprising a plurality of terminals arranged along a first long side of the rectangular active face, and a third terminal column comprising a plurality of terminals arranged along a second long side of the rectangular active face. The second terminal column comprises a third noneffective terminal region within a distance "C" from a short side of the rectangular active face, and an effective terminal region continuing from the third noneffective terminal region. The third terminal column comprises a fourth noneffective terminal region within a distance "D" from the short side of the rectangular active face, and an effective terminal region continuing from the fourth noneffective terminal region. The distances C and D satisfy the relationship:

$$C>D.$$

According to the driving IC described above, even when an external force is applied to a structure comprising this IC mounted on the substrate with a conductive adhesive element such as ACF by dropping or the like, the noneffective terminal region is formed on the region of the IC chip where large stresses are generated. Thus, even when the IC locally detaches at such a region, conduction failure between the IC chip and the substrate can be prevented.

(12) Another aspect of the present invention provides a driving IC comprising a rectangular active face, a first terminal column comprising a plurality of terminals arranged along a short side of the rectangular active face, and a second terminal column comprising a plurality of terminals arranged along a long side of the rectangular active face. The first terminal column comprises a first noneffective terminal region within a distance "A" from the long side of the rectangular active face, and an effective terminal region continuing from the first noneffective terminal region. The second terminal column comprises a third noneffective terminal region within a distance "C" from the short side of the rectangular active face, and an effective terminal region continuing from the third noneffective terminal region. The distances A and C satisfy the relationship:

$$A>C.$$

According to the driving IC described above, even when an external force is applied to a structure comprising this IC mounted on the substrate with a conductive adhesive element such as ACF by dropping or the like, the noneffective terminal region is formed on the region of the IC chip where large stresses are generated. Thus, even when the IC locally detaches at such a region, conduction failure between the IC chip and the substrate can be prevented.

(13) Another aspect of the present invention provides a driving IC comprising a rectangular active face, a first terminal column comprising a plurality of terminals arranged along a short side of the rectangular active face, a second terminal column comprising a plurality of terminals arranged along a first long side of the rectangular active face, and a third terminal column comprising a plurality of terminals arranged along a second long side of the rectangular active face. The distance "G" between a first corner of the rectangular active face and the corresponding intersection of the first terminal column and the second terminal column, and the distance "H" between a second corner of the rectangular active face and the corresponding intersection of the first terminal column and the third terminal column satisfy the relationship:

$$G>H.$$

According to the driving IC described above, even when an external force is applied to a structure comprising this IC mounted on the substrate with a conductive adhesive element such as ACF by dropping or the like, the noneffective terminal region is formed on the region of the IC chip where large stresses are generated. Thus, even when the IC locally detaches at such a region, conduction failure between the IC chip and the substrate can be prevented.

(14) Another aspect of the present invention provides a driving IC comprising a rectangular active face, a second terminal column comprising a plurality of terminals arranged along a first long side of the rectangular active face, and a third terminal column comprising a plurality of terminals arranged along a second long side of the rectangular active face. The distance "a" between the second terminal column and the first long side of the rectangular active face and the distance "b" between the third terminal column and the second long side of the rectangular active face satisfy the relationship:

a>b.

According to the driving IC described above, even when an external force is applied to a structure comprising this IC mounted on the substrate with a conductive adhesive element such as ACF by dropping or the like, the noneffective terminal region is formed on the region of the IC chip where large stresses are generated. Thus, even when the IC locally detaches at such a region, conduction failure between the IC chip and the substrate can be prevented.

(15) Another aspect of the present invention provides a driving IC comprising a rectangular active face and a terminal column comprising a plurality of terminals arranged along a short side of the rectangular active face, the terminal column comprising a first noneffective terminal region within a distance "A" from a first long side and an effective terminal region continuing from the first noneffective terminal region, the first noneffective terminal region and the effective terminal region arranged in that order when viewed from the first long side, wherein A>0.2 mm.

According to the driving IC described above, even when an external force is applied to a structure comprising this IC mounted on the substrate with a conductive adhesive element such as ACF by dropping or the like, the noneffective terminal region is formed on the region of the IC chip where large stresses are generated. Thus, even when the IC locally detaches at such a region, conduction failure between the IC chip and the substrate can be prevented.

(16) Another aspect of the present invention provides a driving IC comprising a rectangular active face and a terminal column comprising a plurality of terminals arranged along a long side of the rectangular active face. The terminal column comprises a first noneffective terminal region within a distance "C" from a short side of the rectangular active face, and an effective terminal region continuing from the first noneffective terminal region, wherein C>0.2 mm.

According to the driving IC described above, even when an external force is applied to a structure comprising this IC mounted on the substrate with a conductive adhesive element such as ACF by dropping or the like, the noneffective terminal region is formed on the region of the IC chip where large stresses are generated. Thus, even when the IC locally detaches at such a region, conduction failure between the IC chip and the substrate can be prevented.

(17) In the driving IC according to each one of (10) to (16) above, each noneffective terminal region may comprise a dummy terminal that has the same shape as that in the effective terminal region but does not carry electric current.

If a region having no bumps is provided in a terminal or bump arrangement formed on the active face of the IC chip, bonding failure or connection failure may occur due to nonuniform alignment of the bumps in mounting the IC chip on a substrate using a conductive adhesive element such as ACF at the active face of the IC. By forming dummy bumps as in (17) above, the bump arrangement can be made uniform, and bonding failure and connection failure can thus be prevented.

(18) The present invention also provides an electronic apparatus comprising the electrooptic device having the above-described structure, a casing for accommodating the electrooptic device, and controlling means for controlling the operation of the electrooptic device. This electronic apparatus rarely suffers from degradation of display quality even when the apparatus is dropped. Examples of such electronic apparatuses include various apparatuses such as cellular phones, portable information terminals, personal computers, digital cameras, wristwatches, which operate electronically.

DETAILED DESCRIPTION OF THE PREFERRED EMBODIMENTS (First Embodiment of an Electrooptic Device)

Figure 1:
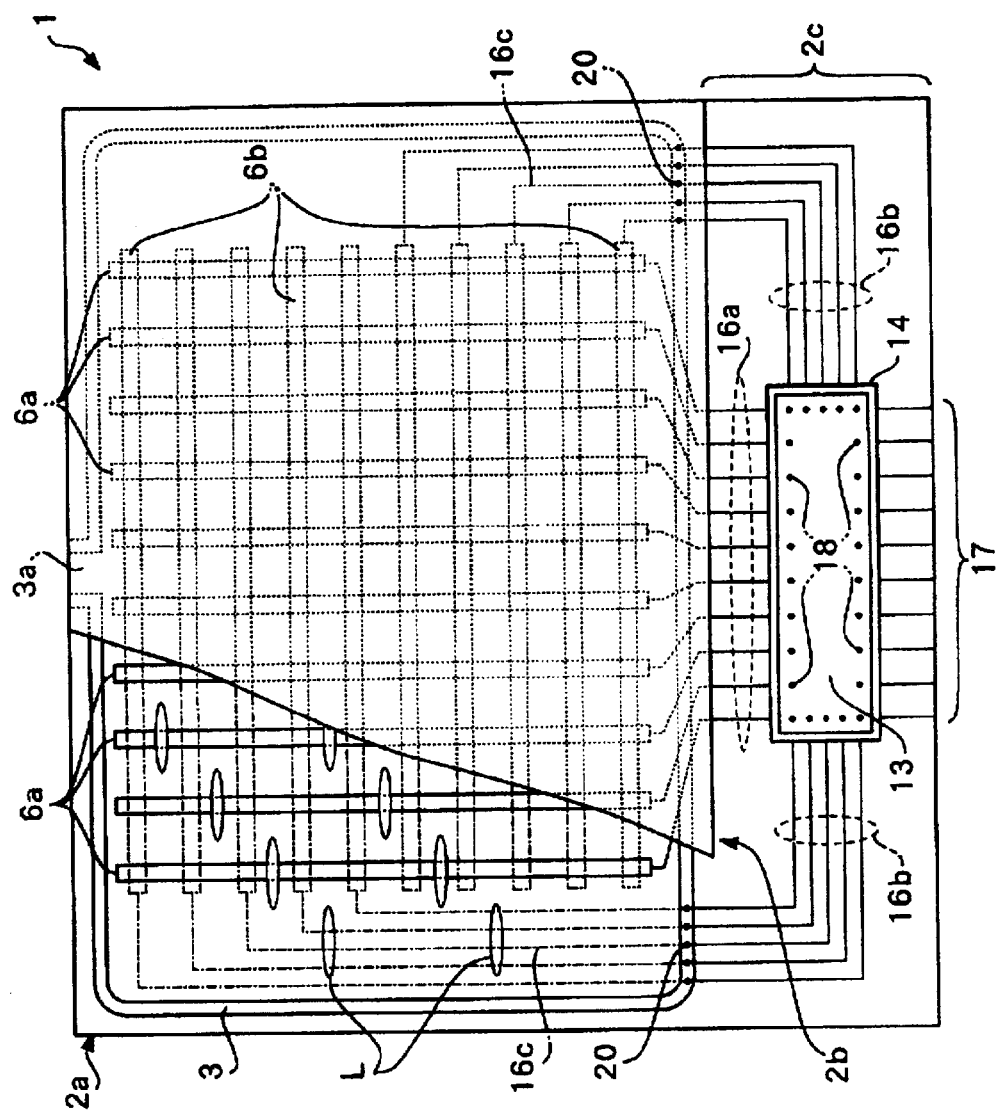
FIG. 1 is a partial fragmentary plan view showing the structure of a liquid crystal device according to an embodiment of an electrooptic device of the present invention.

An electrooptic device of the present invention will now be described in detail with reference to the drawings. FIG. 1 shows an embodiment of the electrooptic device of the present invention applied to a liquid crystal device.

In FIG. 1, a liquid crystal device 1 is formed by bonding the peripheral portions of a first substrate 2a and a second substrate 2b with a sealing member 3. In the drawing in FIG. 1, the first substrate 2a is illustrated behind the second substrate 2b relative to the plane of the drawing. The interior of the liquid crystal device 1 functions as a cell gap which is a space defined by the first substrate 2a, the second substrate 2b, and the sealing member 3.

A liquid crystal inlet 3a is formed in a portion of the sealing member 3. Liquid crystal, for example, super twisted nematic (STN) liquid crystal, is fed into the cell gap through the liquid crystal inlet 3a. When feeding is completed, the liquid crystal inlet 3a is sealed with resin or the like.

Figure 2:
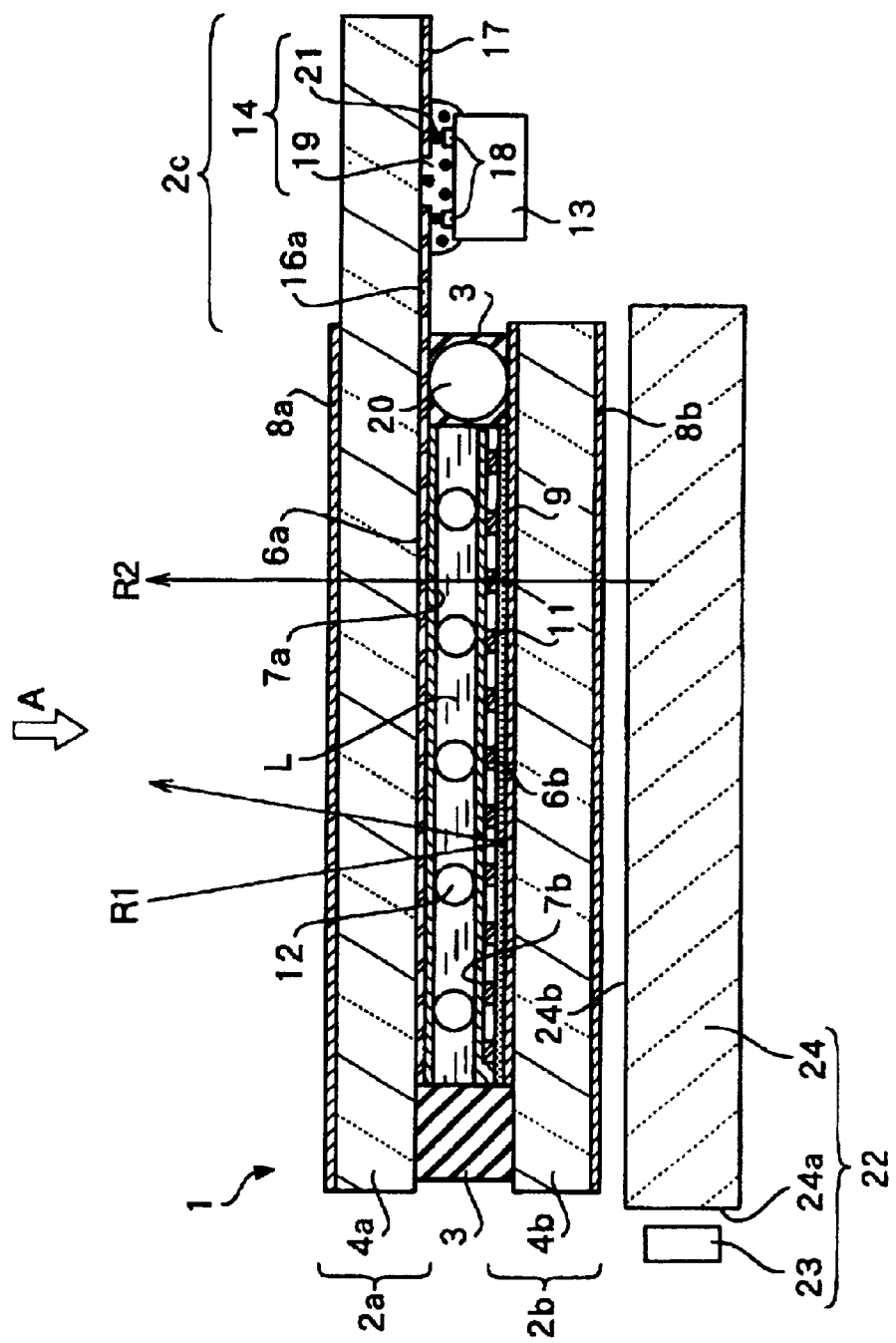
FIG. 2 is a cross-sectional view showing the cross-sectional structure of the liquid crystal device shown in FIG. 1.

As shown in FIG. 2, the first substrate 2a has a base 4a having a rectangular or a square shape when viewed in the direction of arrow A, i.e., the observing direction. First electrodes 6a are formed on the inner surface of the base 4a, and an alignment film 7a is formed on the first electrodes 6a. A polarizer 8a is attached onto the outer surface of the base 4a by, for example, bonding. The first electrodes 6a function as scan electrodes or signal electrodes.

The second substrate 2b has a base 4b, and a semi-transmissive reflector 9 is formed on the inner surface of the base 4b. An insulating film 11 is formed on the semi-transmissive reflector 9, second electrodes 6b are formed on the insulating film 11, and an alignment film 7b is formed on the second electrodes 6b. A polarizer 8b is attached onto the outer surface of the base 4b by, for example, bonding. The second electrodes 6b function as scan electrodes or signal electrodes.

The peripheries of the first substrate 2a and the second substrate 2b are bonded to each other with the sealing member 3. A plurality of spacers 12 are scattered on the inner surfaces of the first substrate 2a and the second substrate 2b. The spacers 12 sustain the gap between the two substrates, i.e., the cell gap, at a predetermined dimension within the planar region. Liquid crystal L is sealed in this cell gap.

On the inner face or the outer face of at least one of the first substrate 2a and the second substrate 2b, an optical element other than those described above may be provided. Examples of optical elements include a light scattering plate for scattering light entering the liquid crystal L or emitted from the liquid crystal L so as to make uniform flat light, an overcoating layer deposited on the first electrodes 6a and second electrodes 6b to render a smooth surface, a color filter for achieving color display, and a retarder for remodulating the polarization property of the light transmitted through the liquid crystal L so as to achromatize the transmitted light and improve visual performance.

The base 4a and the base 4b are made of a light transmitting material. Examples of light transmitting materials include a hard light transmitting material such as glass and a flexible light transmitting material such as plastic. The semi-transmissive reflector 9 is made of a metal material such as aluminum (Al). Either the thickness of the semi-transmissive reflector 9 is decreased or openings for allowing light to transmit through are formed in the semi-transmissive reflector 9 so as to achieve semi-transmissive reflection.

The first electrodes 6a and the second electrodes 6b are made of a metal oxide, for example. An example of the metal oxide is indium tin oxide (ITO). The alignment film 7a and the alignment film 7b are made of a polyimide resin. The alignment film 7a and the alignment film 7b are subjected to alignment treatment such as rubbing, which determines the alignment of the liquid crystal molecules on the surface of the substrates.

As shown in FIG. 1, the first electrode 6a is formed into a striped configuration by arranging a plurality of linear patterns in parallel to one another. The second electrodes 6b are also formed into a striped configuration by arranging a plurality of linear patterns in parallel to one another, the second electrode 6b intersecting the first electrodes 6a. A plurality of points where the first electrodes 6a intersect the second electrode 6b with a liquid crystal layer therebetween are arranged in a dot matrix and forms display dots, each of which is the minimum unit for displaying images.

In a black-and-white display, each of these display dots constitutes one pixel. In a full-color display using three primary colors, i.e., red (R), green (G), and blue (B), three display dots corresponding to R, G, and B constitute one pixel. A region where a plurality of pixels are arranged in a matrix becomes a display region in which alphabets, numerals, and the like are displayed.

For the purpose of simplification, FIG. 1 illustrates only few of the first electrodes 6a and the second electrodes 6b with a gap therebetween larger than the actual gap. In practice, a large number of the electrodes are formed with a significantly small gap therebetween.

In FIG. 1, the first substrate 2a has an overhang section 2c extending outward from the second substrate 2b. On the overhang section 2c, interconnections 16a, interconnections 16b, and terminals 17 are formed. The interconnections 16a extend from the first electrode 6a on the first substrate 2a. The interconnections 16b are connected to interconnections 16c on the second substrate 2b via conductors 20 (see FIG. 2) dispersed in the sealing member 3. The interconnections 16c are connected to the second electrode 6b. Note that although the width of the sealing member 3 is illustrated slightly larger than the diameter of the conductor 20 in FIG. 2, this is for illustrative purpose only. In practice, the width of the sealing member 3 is significantly larger than the diameter of the conductor 20.

On the overhang section 2c, a driving IC 13 is directly mounted using an ACF 14. The face of the driving IC 13 mounted on the overhang section 2c through the ACF 14 is the active face, and a plurality of terminals, i.e., bumps 18 are formed on the active face. The ACF 14 is a polymeric conductive film used for electrically connecting a pair of terminals by providing anisotropy. For example, as shown in FIG. 2, the ACF 14 is made by dispersing conductive particles 21 into a thermoplastic or thermosetting resin film 19.

By thermally press-bonding, i.e., by applying pressure while heating, the driving IC 13 onto the overhang section 2c with the ACF 14 therebetween, the driving IC 13 is bonded to the overhang section 2c via the resin 19. Moreover, the interconnections 16a and 16b, and the terminals 17 on the substrate can be electrically connected to the bumps 18 of the driving IC 13 through the conductive particles 21.

In FIG. 2, a lighting device 22 which functions as a back light is disposed at the rear side, i.e., the lower side of the drawing in FIG. 2, of the second substrate 2b. Note that the lighting device 22 is omitted from the drawing in FIG. 1. The lighting device 22 comprises a light source 23 for emitting light, and an optical conductor 24 for propagating the light from the light source 23. The light source 23 may comprise a point light source such as a light emitting diode (LED) or a linear light source such as a cold-cathode tube. The optical conductor 24 is made of, for example, an acrylic resin, or a polycarbide resin. The face opposing the light source 23 is a light entrance face 24a and the face opposing the second substrate 2b is a light emission face 24b.

Because of the above-described structure, the liquid crystal device 1 of this embodiment is operated by selecting one of the two display modes, i.e., the reflective display mode and the transmissive display mode. In the reflective display mode, light R1 supplied from the outside of the base 4a is fed to the layer of the liquid crystal L by reflecting the light at the semi-transmissive reflector 9. Meanwhile, a voltage applied to the liquid crystal L is controlled for individual pixels so as to control the alignment of the liquid crystal for individual pixels. Accordingly, the light supplied to the layer of the liquid crystal L is modulated for each of the pixels, and the modulated light is supplied to the polarizer 8a, thereby displaying images such as alphabets to the outside of the base 4a.

When the transmissive display is performed using the liquid crystal device 1 of this embodiment, the light source 23 of the lighting device 22 is turned on. Light from the light source 23 enters the optical conductor 24 through the light entrance face 24a, spreads to be flat as the light is transmitted through the optical conductor 24, and is emitted from the light emission face 24b. Accordingly, flat light R2 can be supplied to the layer of the liquid crystal. This light is modulated by the liquid crystal L to perform display, as in the reflective display mode.

Figure 3:
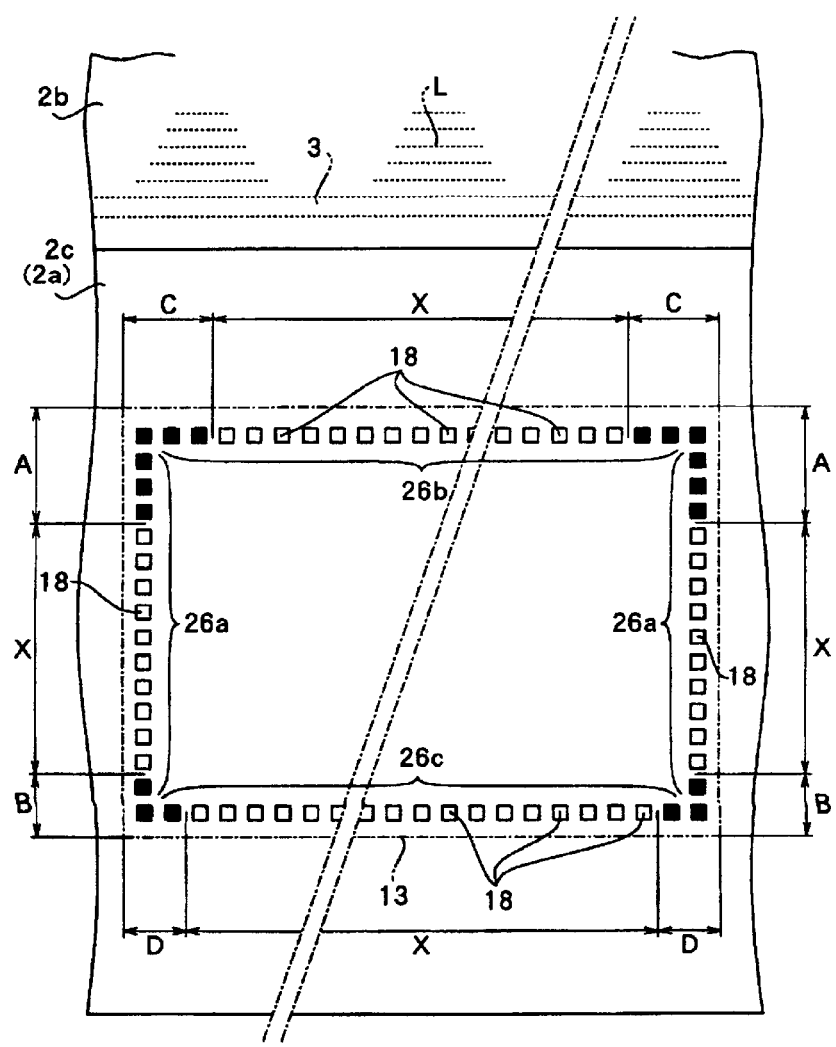
FIG. 3 is a plan view showing an example of a bump arrangement of a driving IC which is the main component of FIG. 1.

As shown in FIG. 1, the planar shape of the driving IC 13 is rectangular. The driving IC 13 is mounted on the overhang section 2c so that an end face of the driving IC 13 along a long side extends in parallel to an edge of the region where the liquid crystal L is sealed closest to the driving IC 13 (hereinafter "the liquid crystal L sealing region) and so that an end face of the driving IC 13 along a short side extends in a direction away from the liquid crystal L sealing region. FIG. 3 is an enlarged view of the driving IC 13 shown in FIG. 2 and illustrates the arrangement of the bumps 18 formed on the active face of the driving IC 13 in detail.

As shown in FIG. 3, on the active face of the driving IC 13, a first terminal column 26a comprising a plurality of bumps 18 aligned in a direction away from the liquid crystal L, a second terminal column 26b close to the liquid crystal L, the second terminal column 26b comprising a plurality of bumps 18 aligned in parallel to the edge of the liquid crystal L, and a third terminal column 26c remote from the liquid crystal L, the third terminal column 26c comprising a plurality of bumps 18 aligning in parallel to the edge of the liquid crystal L are formed.

The first terminal column 26a comprises, from those close to the liquid crystal L, a first noneffective terminal region within a distance "A" from the long side of the driving IC 13, and an effective terminal region X continuing from the first noneffective terminal region, and a second noneffective terminal region within a distance "B" from the other long side of the driving IC 13, the second noneffective terminal region continuing from the effective terminal region. In this embodiment, A>B, and A>0.2 mm.

The second terminal column 26b comprises third noneffective terminal regions each within a distance "C" from the corresponding short side of the driving IC 13 and an effective terminal region X continuing from the third noneffective terminal regions. The third terminal column 26c comprises fourth noneffective terminal regions each within a distance "D" from the corresponding short side of the driving IC 13 and an effective terminal region X continuing from the fourth noneffective terminal regions. In this embodiment,

C>D.

The relationship between the distance "A" of the first noneffective terminal region of the first terminal column 26a and the distance "C" of the third noneffective terminal region of the second terminal column 26b are adjusted to satisfy the relationship:

A>C.

The term "effective terminal region" refers to a region in which the bumps 18 have normal function of carrying electric current. The term "noneffective terminal region" refers to a region in which the bumps 18 do not carry electric current although the bumps 18 have the identical shapes as those in the effective terminal region, i.e., a dummy bump region. The noneffective terminal region is not limited to the dummy bump region. No bumps 18 may be formed in the noneffective terminal region so as to make this region a terminal-free region.

Figure 8:
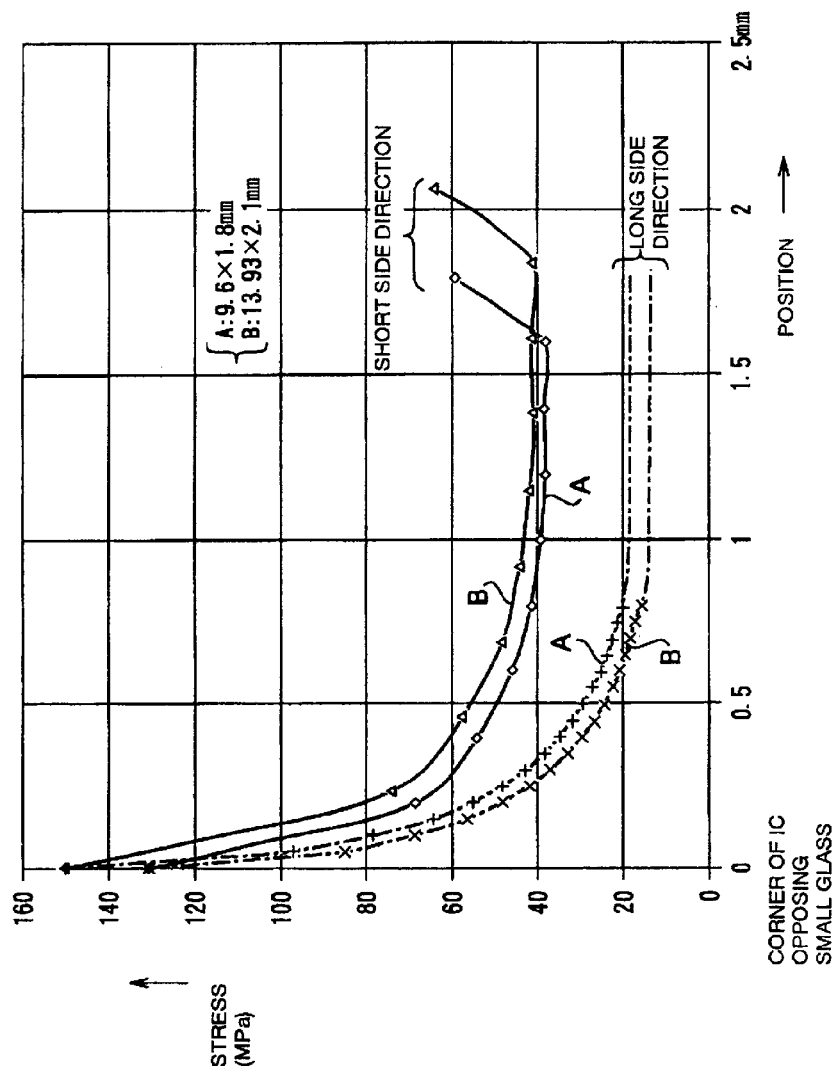
FIG. 8 is a graph showing the results of the experiment conducted under conditions described in FIG. 7.

According to the graph in FIG. 8, in an IC chip, significantly larger stresses are applied to the corners of the IC chip opposing the small glass, i.e., the corners that are close to the liquid crystal L, than to the corners that are remote from the liquid crystal L. Accordingly, it is likely that the IC chip will locally detach at the corners that are close to the liquid crystal L and in the vicinity of such corners. Thus, as in this embodiment, in the first terminal column 26a, the relationship between the distance A of the noneffective terminal region close to the liquid crystal L and the distance B of the noneffective terminal region remote from the liquid crystal L should be adjusted to satisfy the relationship:

A>B.

In this manner, the above-described local detachment of the IC chip is not likely to adversely affect the effective terminal region because only dummy bumps are provided at the region where the IC chip is detached. Thus, degradation in the display quality of the liquid crystal device 1 can be prevented even when an external force is applied to the liquid crystal device 1.

Since the IC chip is likely to locally detach at the corners close to the liquid crystal L and in the vicinity thereof, the relationship between the distance C of the noneffective terminal region of the second terminal column 26b close to the liquid crystal L and the distance D of the noneffective terminal region of the third terminal column 26c remote from the liquid crystal L should be adjusted to satisfy the relationship:

C>D, as in this embodiment. In this manner, the local detachment of the IC chip is not likely to adversely affect the effective terminal region because only dummy bumps are provided at the region where the IC chips are detached. Thus, degradation in the display quality of the liquid crystal device 1 can be prevented even when an external force is applied to the liquid crystal device 1.

The graph in FIG. 8 demonstrates that, at positions approximately 0.2 mm distant from the corners of the IC chip opposing the small glass, i.e., the corners of the driving IC 13 close to the liquid crystal L, the generated stresses become sufficiently small. Accordingly, by adjusting the distance "A" of the first noneffective terminal region of the first terminal column 26a to satisfy the relationship A>0.2 mm as in this embodiment, the detachment of terminals at the effective terminal region can be prevented even when the IC chip is locally detached.

The graph in FIG. 8 demonstrates that, in an IC chip, the stress generated in the direction of the short sides is larger than the stress generated in the direction of the long sides. Because of such a phenomenon, as in this embodiment, the distance A of the noneffective terminal region of the first terminal column 26a aligning in a direction away from the liquid crystal L and the distance C of the noneffective terminal region of the second terminal column 26b close to the liquid crystal L are adjusted to satisfy the relationship:

A>C.

In this manner, the local detachment of the IC chip is not likely to adversely affect the effective terminal region because only dummy bumps are provided at the region where the IC chip is detached. Thus, degradation in the display quality of the liquid crystal device 1 can be prevented even when an external force is applied to the liquid crystal device 1.

(Second Embodiment of an Electrooptic Device)

Figure 4:
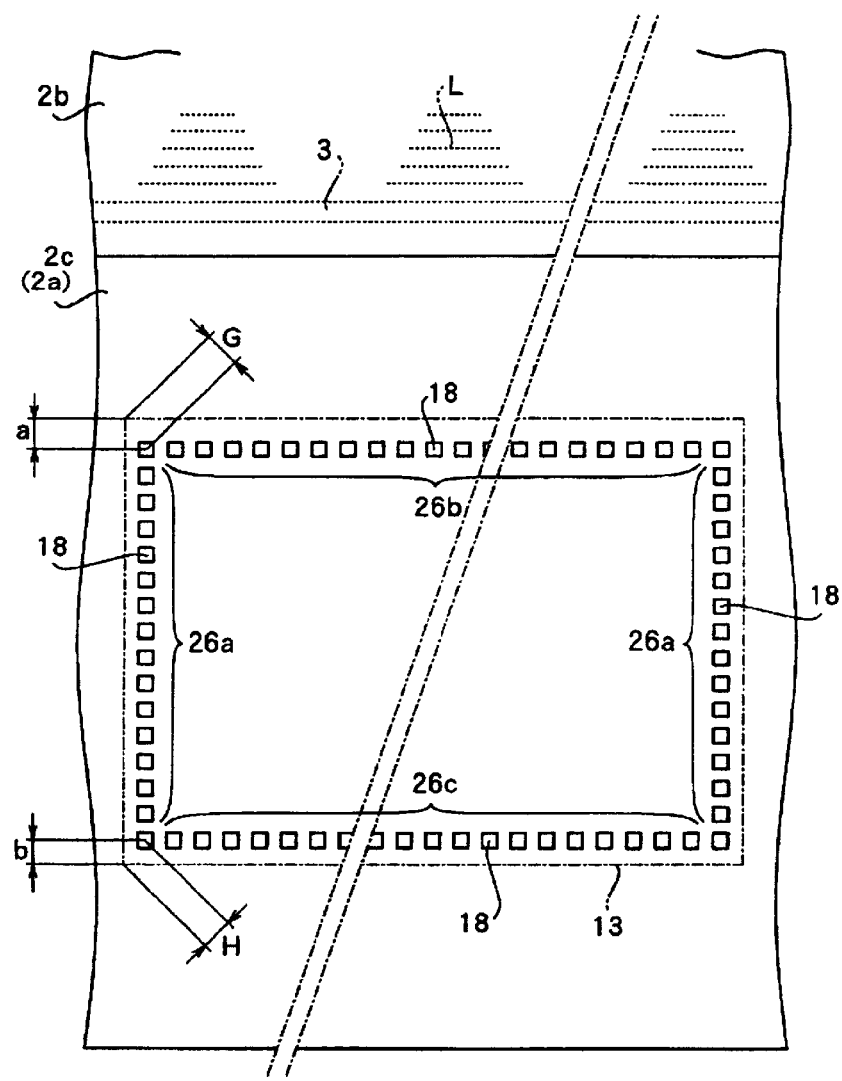
FIG. 4 is a plan view showing another example of a bump arrangement of the driving IC which is the main component of FIG. 1.

FIG. 4 shows another embodiment of an electrooptic device of the present invention. The overall structure of the electrooptic device of this embodiment may be identical to that of the liquid crystal device 1 shown in FIG. 1. The liquid crystal device shown in FIG. 4 differs from the first embodiment of the liquid crystal device in the arrangement of the bumps 18.

As shown in FIG. 4, on the active face of the driving IC 13, the first terminal column 26a comprising the plurality of bumps 18 aligning in a direction away from the liquid crystal L, the second terminal column 26b close to the liquid crystal L, comprising the plurality of bumps 18 aligning in parallel to the edge of the liquid crystal L sealing region, and the third terminal column 26c remote from the liquid crystal L, comprising the plurality of bumps 18 aligning in parallel to the edge of the liquid crystal L.

In this embodiment, all of the bumps 18 that constitute the first terminal column 26a, the second terminal column 26b, and the third terminal column 26c are effective terminals. Moreover, the distance G from a corner of the driving IC 13 to the intersection of the first terminal column 26a and the second terminal column 26b in the vicinity of the liquid crystal L and the distance H from a corner of the driving IC 13 to the intersection of the first terminal column 26a and the third terminal column 26c remote from the liquid crystal L are adjusted to satisfy the relationship:

G>H.

The distance "a" from a long side of the driving IC 13 to the second terminal column 26b and the distance "b" from the other long side of the driving IC 13 to the third terminal column 26c are adjusted to satisfy the relationship a>b.

According to the graph in FIG. 8, in an IC chip, significantly larger stresses are applied to the corners of one IC chip close to the small glass, i.e., the corners that are close to the liquid crystal L, than to the corners that are remote from the liquid crystal L. When the distance G between the corner of the driving IC 13 and the end portion of the first terminal column 26a close to the liquid crystal L is adjusted to be larger than the distance H between another corner of the driving IC 13 and the end portion of the first terminal column 26a remote from the liquid crystal L as in this embodiment, an external force applied to the driving IC 13 may cause large local detachment of the driving IC 13 at the region close to the liquid crystal L but the disconnection of the bumps 18 can be prevented.

As in this embodiment, when the distance "a" from a long side of the driving IC 13 to the second terminal column 26b is larger than the distance "b" from the other long side of the driving IC 13 to the third terminal column 26c, an external force applied to the driving IC may cause large local detachment of the driving IC 13 at the region close to the liquid crystal L, but the disconnection of the bumps 18 can be prevented for the same reasons as above.

(Third Embodiment of an Electrooptic Device)

Figure 5:
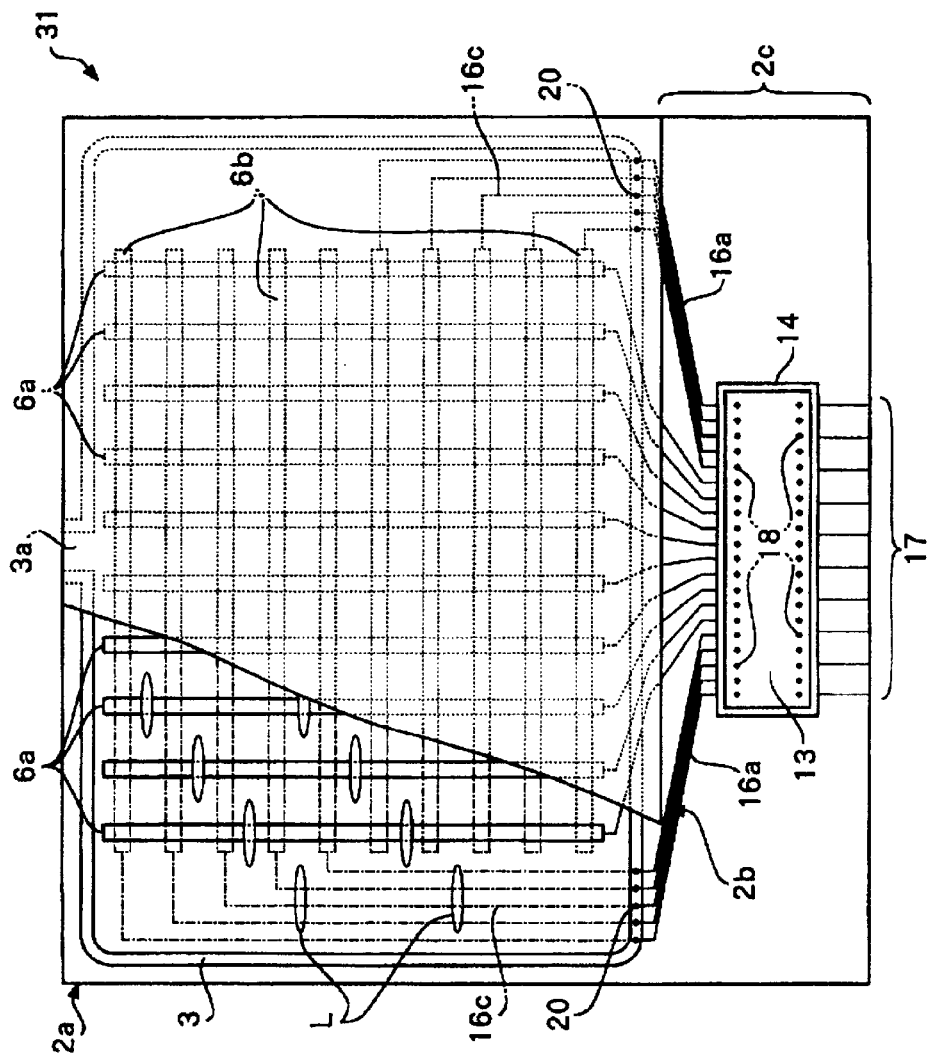
FIG. 5 is a partial fragmentary plan view showing the structure of a liquid crystal device according to another embodiment of the electrooptic device of the present invention.
Figure 6:
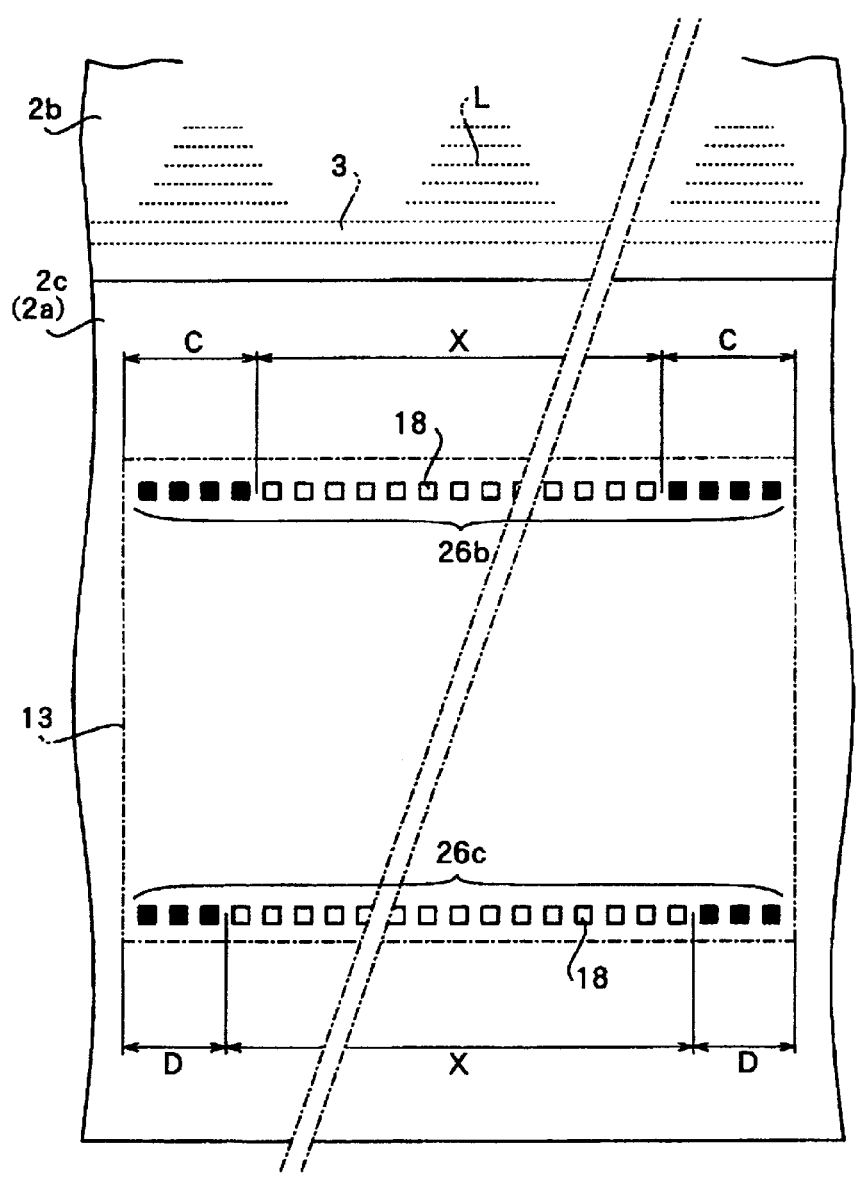
FIG. 6 is a plan view showing an example of a bump arrangement of a driving IC which is the main component of FIG. 5.
Figure 7:
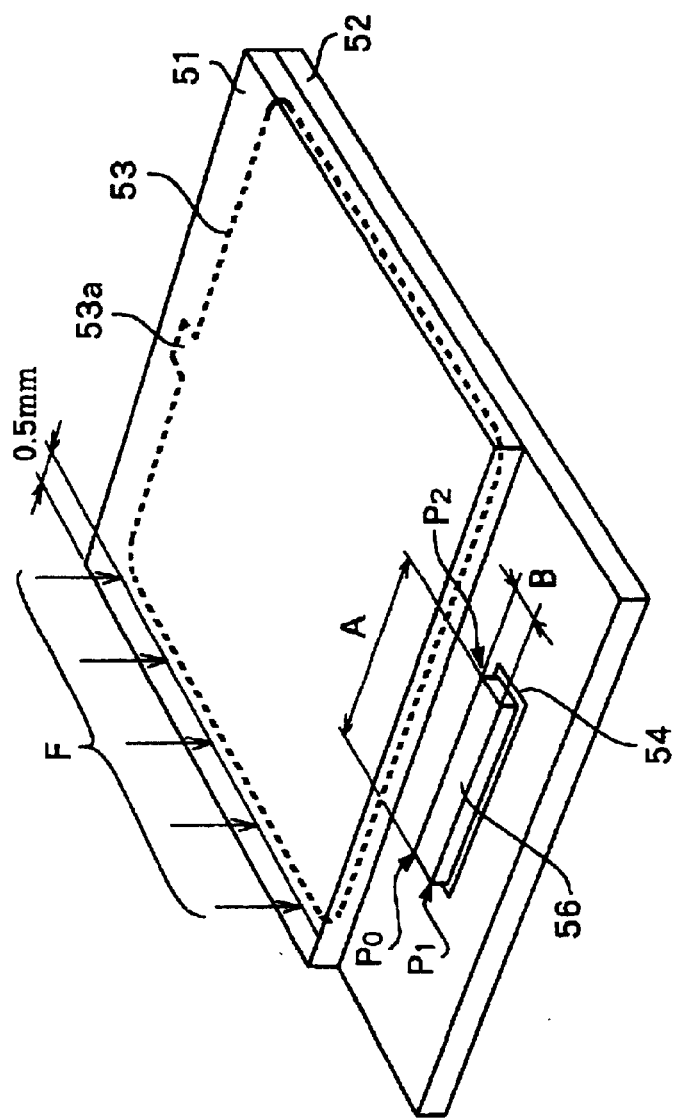
FIG. 7 is a perspective diagram for explaining experimental conditions of the liquid crystal device.

FIG. 5 shows another embodiment of the present invention applied to a liquid crystal device which is an example of the electrooptic device. A liquid crystal device 31 shown in FIG. 5 differs from the previous embodiment shown in FIG. 1 in that, as shown in FIG. 6, no terminal columns of bumps aligning in a direction away from the liquid crystal L are formed on the active face of the driving IC 13. On the active face of the driving IC 13, the second terminal column 26b comprising the plurality of bumps 18 aligning in parallel with the edge of the liquid crystal L at the vicinity of the liquid crystal L and the third terminal column 26c comprising the plurality of bumps 18 aligning in parallel with the edge of the liquid crystal L remote from the liquid crystal L are formed.

The second terminal column 26b has third noneffective terminal regions each within a distance "C" from the corresponding short side of the IC 13 and an effective terminal section X continuing from the third noneffective terminal regions. The third terminal column 26c has fourth noneffective terminal regions each within a distance "D" from the corresponding short side of the driving IC 13 and an effective terminal region X continuing from the fourth noneffective terminal regions. In this embodiment, C>D, and C>0.2 mm.

According to the graph shown in FIG. 8, in an IC chip, significantly large stresses are generated at the corners opposing the small glass, i.e., the corners close to the liquid crystal L, compared to the corners remote from the liquid crystal L. Thus, the corners close to the liquid crystal and the vicinities thereof are likely to suffer from the separation of the IC chips. When the distance C of the noneffective terminal regions of the second terminal column 26b close to the liquid crystal L and the distance D of the noneffective terminal regions of the third terminal column 26c remote from the liquid crystal L satisfy the relationship C>D as in this embodiment, the separation of the IC chips does not adversely affect the effective terminal region since it is likely that only dummy bumps are formed on the separated regions. In this manner, the degradation in the display quality of the liquid crystal device 1 can be prevented even when an external force is applied to the liquid crystal device 31.

FIG. 8 demonstrates that the generated stresses are sufficiently decreased at a position approximately 0.2 mm distant from the corners of the driving IC 13 opposing the small glass, i.e., the corners close to the liquid crystal L. Accordingly, as in this embodiment, by setting the distance "C" of the third noneffective terminal regions of the second terminal column 26b to C>0.2 mm, the detachment of terminals in the effective terminal region can be prevented even when the local detachment of the IC chips occur.

(Embodiments of Electronic Apparatuses)

Figure 9:
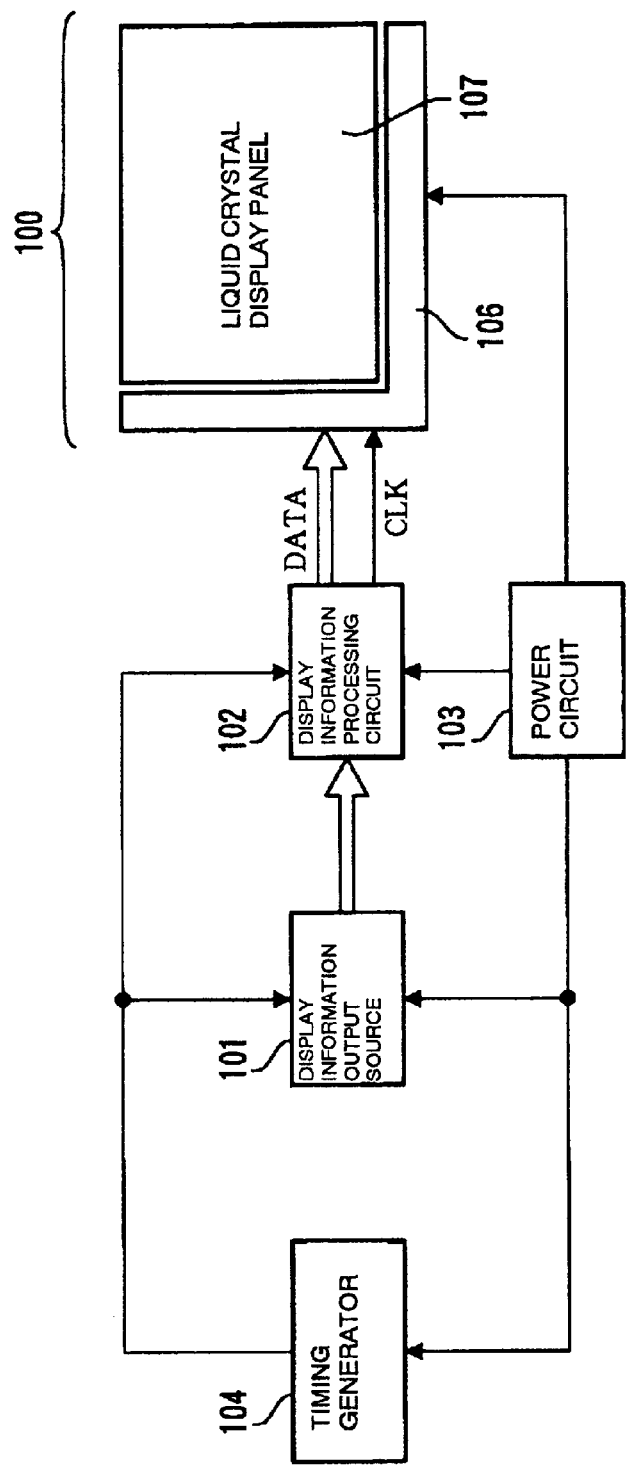
FIG. 9 is a circuit block diagram showing an embodiment of an electronic apparatus according to the present invention.

FIG. 9 shows an embodiment of an electronic apparatus according to the present invention. The electronic apparatus comprises a display information output source 101, a display information processing circuit 102, a power circuit 103, a timing generator 104, and a liquid crystal device 100. The liquid crystal device 100 has a liquid crystal panel 107 and a driving circuit 106.

The display information output source 101 includes a memory such as random access memory (RAM), a storage unit such as various disks, a tuning circuit for tuning and outputting digital image signals, and the like. The display information output source 101 supplies the display information processing circuit 102 with display information such as image signals of a predetermined format based on various clock signals generated by the timing generator 104.

The display information processing circuit 102 comprises many known circuits such as an amplifying/inverting circuit, a rotation circuit, a gamma correction circuit, and a clamp circuit. The display information processing circuit 102 processes the input display information and supplies the driving circuit 106 with the image signals along with a clock signal CLK. The driving circuit 106 is a generic term including a scan line driving circuit (not shown), a data line driving circuit (not shown), a detecting circuit, and the like. The power circuit 103 supplies a predetermined power voltage to each of the elements above.

The liquid crystal device 100 may have the same structure as that of the liquid crystal device 1 shown in FIG. 1. With this structure, an electronic apparatus having superior resistance to physical impact can be formed since the conduction failure of the driving IC 13 shown in FIG. 1 rarely occurs even when the whole body of the electronic apparatus is dropped.

Figure 10:
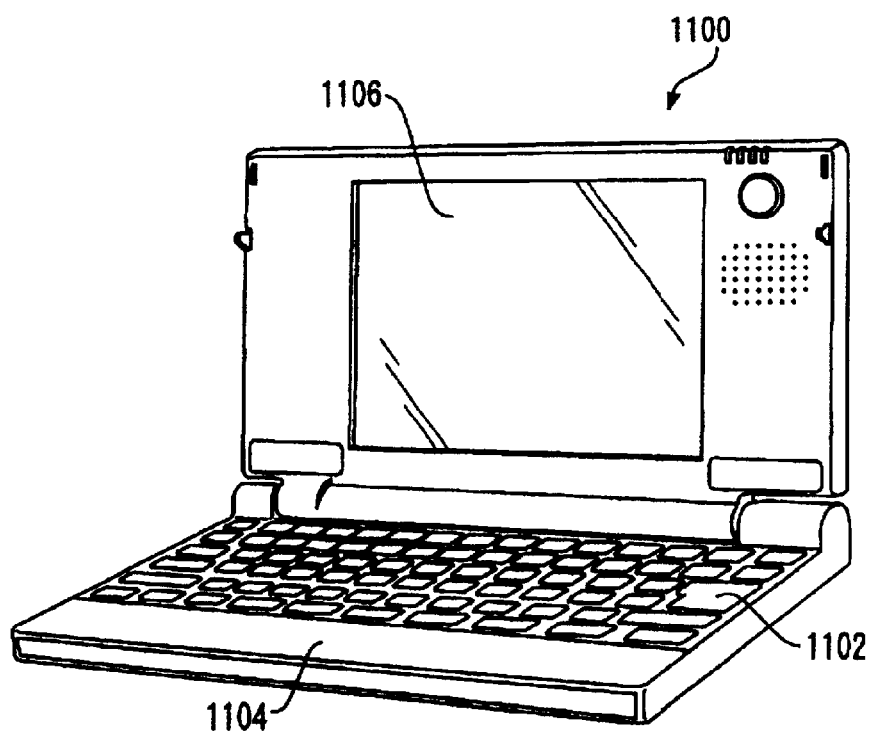
FIG. 10 is a perspective view showing a personal computer according to another embodiment of the electronic apparatus of the present invention.

FIG. 10 shows a mobile personal computer which is an electronic apparatus of another embodiment of the present invention. The personal computer 1100 has a main unit 1104 having a keyboard 1102, and a liquid crystal display unit 1106. The display section of the liquid crystal display unit 1106 may comprise the liquid crystal device 1 shown in FIG. 1. With this structure, conduction failure of the driving IC 13 shown in FIG. 1 rarely occurs even when the whole body of the personal computer 1100 is dropped, and a personal computer highly resistant to physical impact can be formed.

Figure 11:
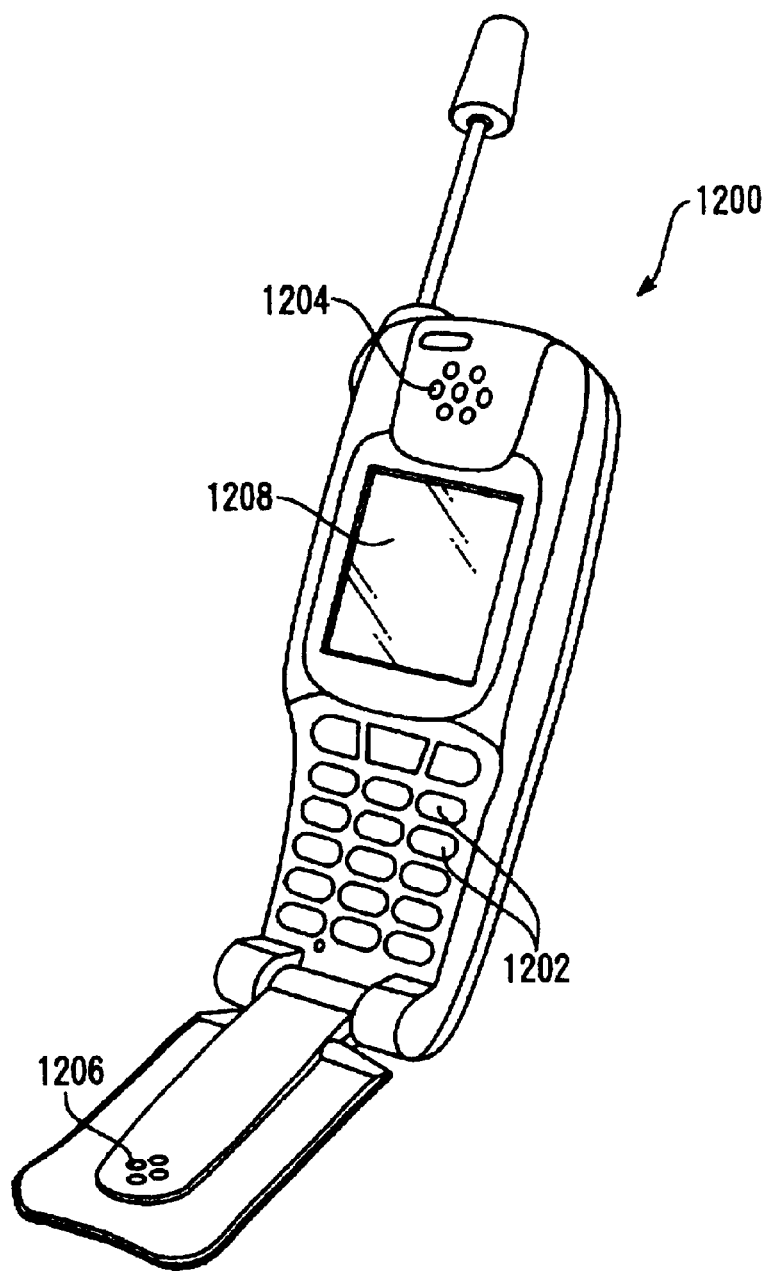
FIG. 11 is a perspective view showing a cellular phone according to another embodiment of the electronic apparatus of the present invention.

FIG. 11 shows a cellular phone which is an electronic apparatus according to yet another embodiment of the present invention. A cellular phone 1200 shown in FIG. 11 includes a plurality of operation buttons 1202, a mouthpiece 1204, an earpiece 1206, and a liquid crystal display unit 1208.

The liquid crystal display unit 1208 may comprise the liquid crystal device 1 shown in FIG. 1, for example. With this structure, conduction failure of the driving IC 13 shown in FIG. 1 rarely occurs even when the entire body of the cellular phone 1200 is dropped, and a cellular phone having high resistance to physical impact can be manufactured.

Figure 12:
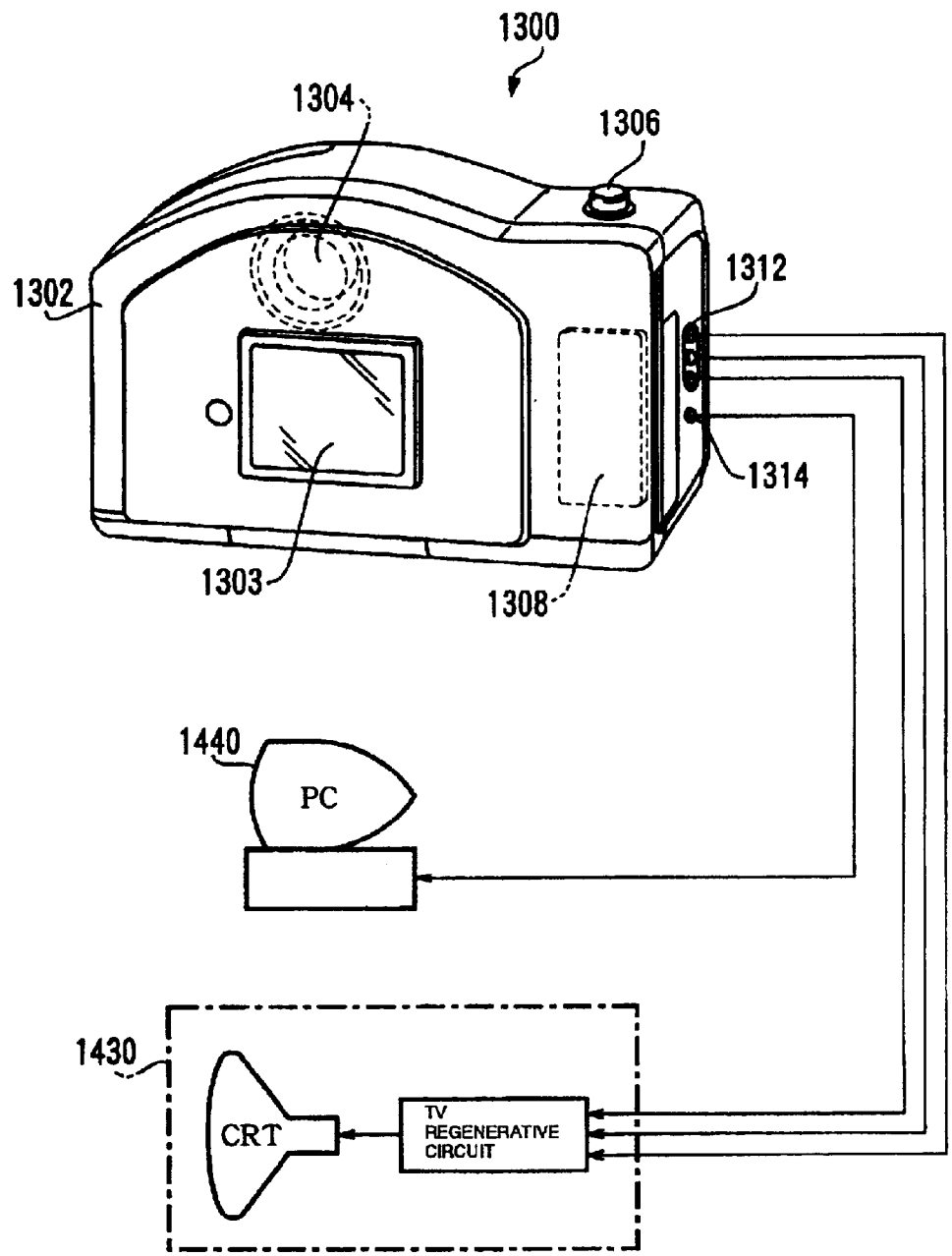
FIG. 12 is a perspective view of a digital camera according to another embodiment of the electronic apparatus of the present invention.

FIG. 12 shows a digital still camera which is an electronic apparatus according to yet another embodiment of the present invention. The digital still camera uses a liquid crystal device as a finder. In a common camera, the film is exposed using an optical image of an object. In contrast, a digital still camera 1300 generates image signals by photoelectric conversion of the optical image of the object using an imaging element such as a charge coupled device (CCD).

On the rear face of a casing 1302 of the digital still camera 1300, a liquid display unit 1303 is disposed so as to display images according to the image signal generated by CCD. Accordingly, the liquid crystal unit 1303 functions as a finder for displaying the object. The liquid display unit 1303 may comprise the liquid crystal device 1 shown in FIG. 1, for example. With this structure, the conduction failures of the driving IC 13 shown in FIG. 1 can be prevented even when the entire body of the camera 1300 is dropped, and a camera having a superior resistance to physical impact can be manufactured.

On the front face of the casing 1302, i.e., the face not appearing in the drawing, a photoreceptor unit 1304 including an optical lens, a CCD, and the like is provided. A user acknowledges the object displayed in the liquid crystal display unit 1303 and presses a shutter button 1306 down. The image signal at that moment generated at the CCD is transferred to the memory of a circuit substrate 1308 and is stored in the memory.

On a side face of the casing 1302, a video signal output terminal 1312 and I/O terminal 1314 for data communication are provided. A television monitor 1430 may be connected to the video signal output terminal 1312 if necessary. A personal computer 1440 may be connected to the I/O terminal for data communication if necessary. The image signal stored in the memory of the circuit substrate 1308 is output to the television monitor 1430 and the personal computer 1440 through predetermined operations.

Figure 13:
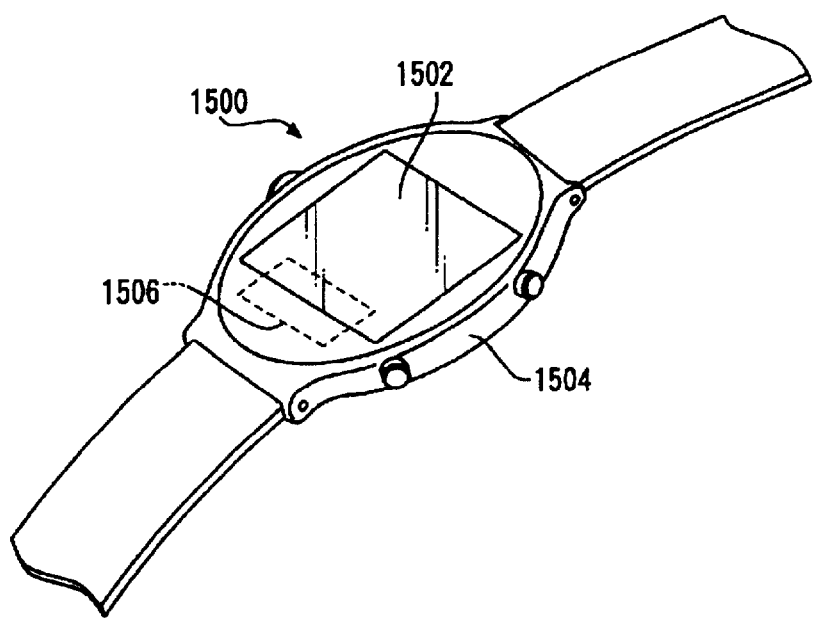
FIG. 13 is a perspective view of a wristwatch type electronic apparatus according to another embodiment of the electronic apparatus of the present invention.

FIG. 13 shows a wristwatch type electronic apparatus which is an electronic apparatus according to yet another embodiment of the present invention. The wristwatch type electronic apparatus 1500 shown in FIG. 13 comprises a watch body 1504 and a liquid crystal display unit 1502 which functions as a display section supported by the watch body 1504. The liquid crystal display unit 1502 may comprise the liquid crystal device 1 shown in FIG. 1, for example. The liquid crystal display unit 1502 is controlled by a control circuit 1506 inside the watch body 1504 and displays information such as time and date.

By using the liquid crystal device 1 in FIG. 1 as the liquid crystal display unit 1502, the conduction failure of the driving IC 13 shown in FIG. 1 can be prevented even when the entire body of the wristwatch type electronic apparatus 1500 is dropped, and an electronic apparatus having excellent resistance against physical impact can be manufactured.

Figure 14:
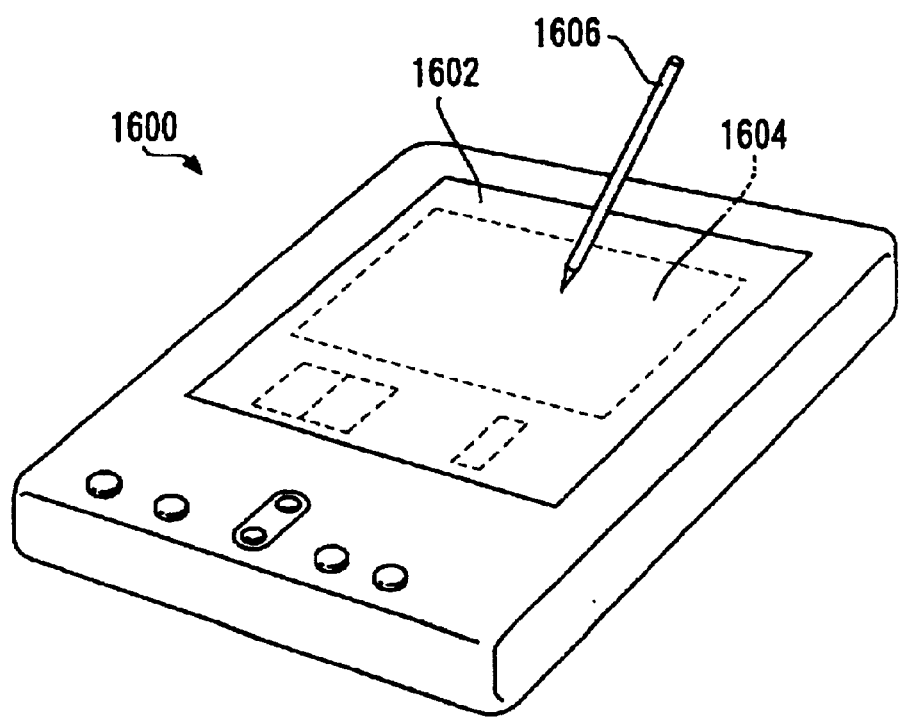
FIG. 14 is perspective view of a PDA according to another embodiment of the electronic apparatus of the present invention.

FIG. 14 shows a portable personal digital assistant (PDA) which is an electronic apparatus of yet another embodiment of the present invention. A PDA 1600 has an input device 1602 of a contact type, i.e., a touch-panel type, on the front panel. The input device 1602 is transparent, and a liquid crystal device 1604 as the display unit is disposed under the input device 1602.

A user may select buttons or other images displayed in the liquid crystal device 1604 or may draw alphabetical characters and diagrams by putting a pen-type input tool 1606 into contact with the input face of the input device 1602 so as to input the desired information. A computer in the PDA 1600 performs a predetermined calculation relative to the input information, and the results of the calculation are displayed in the liquid crystal device 1604. By using the liquid crystal device 1 shown in FIG. 1 as the liquid crystal device 1604, the conduction failure of the driving IC 13 shown in FIG. 1 can be prevented even when the entire body of the PDA 1600 is dropped, and a PDA having high resistance to physical impact can be manufactured.

Examples of the electronic apparatuses other than the above-described personal computer, the cellular phone, the digital still camera, the wrist-watch type electronic apparatus, and PDA, include a liquid crystal television set, a videocassette recorder, a car navigation device, a pager, an electronic databook, a calculator, a word processor, a work station, a television phone, and a POS terminal.

(Other Embodiments)

Although the present invention has been described above by way of preferable embodiments, the scope of the present invention is by no means limited by the above embodiments. Various modifications are possible without departing from the scope of the invention defined in the claims.

For example, although the present invention is applied to the liquid crystal device which is one example of an electrooptic device in the above embodiments, the present invention can be incorporated into other types of electrooptic devices. An example of such an electrooptic device is an electroluminescent device which uses electroluminescence as the electrooptical substance.

Examples of the electrooptic devices include an organic electroluminescent device, an inorganic electroluminescent device, a plasma display device, an electrophoresis display device, and a field emission display device.

Although the liquid crystal device in the drawings such as FIG. 1 is of a simple matrix type, the present invention can be applied to an active matrix liquid crystal device which uses a two-terminal switching element such as a thin film diode (TFD) as an active element and to another type of active matrix liquid crystal device which uses a three-terminal switching element such as a thin film transistor (TFT) as an active element.

According to an electrooptic device, a driving IC, and an electronic apparatus of the present invention, no effective terminals are provided in the region which is likely to suffer from the detachment of the driving IC when an external force is applied to the electrooptic device. Thus, display failures of the electrooptic device can be prevented even when an external force is applied to the electrooptic device. The entire disclosure of Japanese Patent Application Nos. 2001-138817 filed May 9, 2001 and 2002-084193 filed Mar. 25, 2002 is incorporated by reference herein.

What is claimed is:

1. An electrooptic device comprising an electrooptic material, a substrate for supporting the electrooptic material, and an IC chip mounted on the substrate, the IC chip comprising:
   a terminal column comprising a plurality of terminals arranged in a direction away from the electrooptic material; and
   a terminal row comprising a plurality of terminals arranged substantially perpendicular to terminals of the terminal column;

wherein the terminal column comprises a first noneffective terminal region within a distance "A" from a first side of the IC chip located closest to the electrooptic material, an effective terminal region continuing from the first noneffective terminal region, and a second noneffective terminal region within a distance "B" from a second side of the IC chip, the second noneffective terminal region continuing from the effective terminal region, the first noneffective terminal region, the effective terminal region, and the second noneffective terminal region provided in that order when viewed from the electrooptic material;

wherein

A>B; and wherein the terminal row comprises a noneffective terminal region adjoining the first noneffective terminal region.

2. The electrooptic device according to claim 1, wherein the electrooptic material is liquid crystal, and the IC chip is mounted on at least one of a pair of substrates which hold the liquid crystal therebetween.

3. The electrooptic device according to claim 1, wherein each noneffective terminal section comprises a dummy terminal which has the same structure as that formed in the effective terminal region and does not contribute to carrying electric current.

4. An electronic apparatus comprising an electrooptic device according to claim 1, a casing for accommodating the electrooptic device, and controlling means for controlling the operation of the electrooptic device.

5. A driving IC comprising a rectangular active face and a terminal column comprising:
   a terminal column comprising a plurality of terminals arranged along a short side of the rectangular active face; and
   a terminal row comprising a plurality of terminals arranged along a long side of the rectangular active face;
   wherein the terminal column includes a first noneffective terminal region within a distance "A" from a first long side of the rectangular active face, an effective terminal region continuing from the first noneffective terminal region, and a second noneffective terminal region within a distance "B" from a second long side of the rectangular active face, the second noneffective terminal region continuing from the effective terminal region, the first noneffective terminal region, the effective terminal region, and the second noneffective terminal region being provided in that order when viewed from the first long side,
   wherein A>B and wherein the terminal row comprises a noneffective terminal region adjoining the first noneffective terminal region.

6. The driving IC according to claim 5, wherein each noneffective terminal region comprises a dummy terminal that has the same shape as that in the effective terminal region and does not carry electric current.

7. An electrooptic device comprising:
   an electrooptic material;
   a substrate for supporting the electrooptic material; and
   an IC chip mounted on the substrate comprising;
      a first terminal column comprising a plurality of terminals arranged in a direction away from the electrooptic material; and
      a second terminal column comprising a plurality of terminals arranged in a direction away from the electrooptic material, the second terminal column arranged parallel to the first terminal column; and
      a terminal row comprising a plurality of terminals arranged substantially perpendicular to terminals of the first and the second terminal column;
   wherein both the first terminal column and the second terminal column each comprise a first noneffective terminal region within a distance "A" from a first side of the IC chip located closest to the electrooptic material, an effective terminal region continuing from the first noneffective terminal region, and a second noneffective terminal region within a distance "B" from a second side of the IC chip, the second noneffective terminal region continuing from the effective terminal region, the first noneffective terminal region, the effective terminal region, and the second noneffective terminal region provided in that order when viewed from the electrooptic material; and
   wherein A>B; and
   wherein the terminal row comprises a noneffective terminal region adjoining the first noneffective terminal region.

8. An electrooptic device comprising:

an electrooptic material;

a substrate for supporting the electrooptic material; and a rectangular IC chip mounted on the substrate, the IC chip having first and second short edges and first and second long edges, the first and second short edges being aligned in a direction extending away from the electrooptic material;

the IC chip including:
- a first terminal column including a plurality of terminals aligned along the first short edge;
- a second terminal column close to the electrooptic material, the second terminal column including a plurality of terminals aligned along the first long edge; and
- a third terminal column remote from the electrooptic material, the third terminal column including a plurality of terminals aligned along the second long edge;

the first terminal column including a first noneffective terminal region including a plurality of terminals within a distance "A" from the first long edge of the $IC_1$ chip, an effective terminal region continuing from the first noneffective terminal region, and a second noneffective terminal region including a plurality of terminals within a distance "B" from the second long edge of the IC chip;

wherein $A > B$; and the second terminal column including a third noneffective terminal region including a plurality of terminals within a distance "C" from a first short edge of the IC chip, an effective terminal region continuing from the third noneffective terminal region;

the third terminal column including a fourth noneffective terminal region including a plurality of terminals within a distance "D" from the first short edge of the IC chip, an effective terminal region continuing from the fourth moneffective terminal region;

wherein $C > D$.

9. The electrooptic device of claim 8, wherein $A > C$.

* * * * *